United States Patent
Tsai et al.

(10) Patent No.: US 8,189,124 B2
(45) Date of Patent: May 29, 2012

(54) DIGITAL PHOTO FRAME WITH A FUNCTION OF AUTOMATICALLY POWER OFF

(75) Inventors: Ming-Feng Tsai, Taipei Hsien (TW);
 Xiao-Guang Li, Shenzhen (CN);
 Xiao-Fang Chen, Shenzhen (CN);
 Zai-An Pan, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 761 days.

(21) Appl. No.: 12/261,012

(22) Filed: Oct. 29, 2008

(65) Prior Publication Data

US 2009/0147156 A1 Jun. 11, 2009

(30) Foreign Application Priority Data

Dec. 5, 2007 (CN) .......................... 2007 1 0124818

(51) Int. Cl.
 *H04N 5/64* (2006.01)

(52) U.S. Cl. .......................... 348/836; 248/466; 345/204

(58) Field of Classification Search .................... 40/790, 40/792, 796, 757; 345/76, 82, 87, 204, 211–213, 345/102, 156, 158, 158.2; 348/836; 248/466
 See application file for complete search history.

(56) References Cited

U.S. PATENT DOCUMENTS

| | | | | |
|---|---|---|---|---|
| 6,975,308 | B1* | 12/2005 | Bitetto et al. | 345/204 |
| 2007/0040033 | A1* | 2/2007 | Rosenberg | 235/462.36 |
| 2007/0181771 | A1* | 8/2007 | Alcov | 248/466 |
| 2008/0303805 | A1* | 12/2008 | Chien et al. | 345/204 |
| 2009/0002190 | A1* | 1/2009 | L'Henaff | 340/815.4 |
| 2009/0179887 | A1* | 7/2009 | Chang et al. | 345/212 |
| 2009/0276485 | A1* | 11/2009 | Casassovici | 709/203 |
| 2009/0315869 | A1* | 12/2009 | Sugihara et al. | 345/204 |
| 2010/0001947 | A1* | 1/2010 | Lin | 345/156 |
| 2011/0001697 | A1* | 1/2011 | Mao | 345/157 |

FOREIGN PATENT DOCUMENTS

| | | |
|---|---|---|
| CN | 1121643 C | 9/2003 |
| CN | 2648940 Y | 10/2004 |
| JP | 7-234660 | 9/2006 |

* cited by examiner

*Primary Examiner* — Brian Glessner
*Assistant Examiner* — Adam Barlow
(74) *Attorney, Agent, or Firm* — Altis Law Group, Inc.

(57) ABSTRACT

A digital photo frame with a function of automatically power off is provided. The digital photo frame includes a display unit, a power management unit, a storage unit, a detection unit, and a processing unit. The detection unit detects whether there is some one around the digital photo frame. The processing unit controls the power management unit to stop providing power to the display unit if the detection unit detects nobody around the digital photo frame in a first predetermined time period, and controls the power management unit to stop providing power to the digital photo frame if the detection unit detects nobody around the digital photo frame in a second predetermined time period.

2 Claims, 1 Drawing Sheet

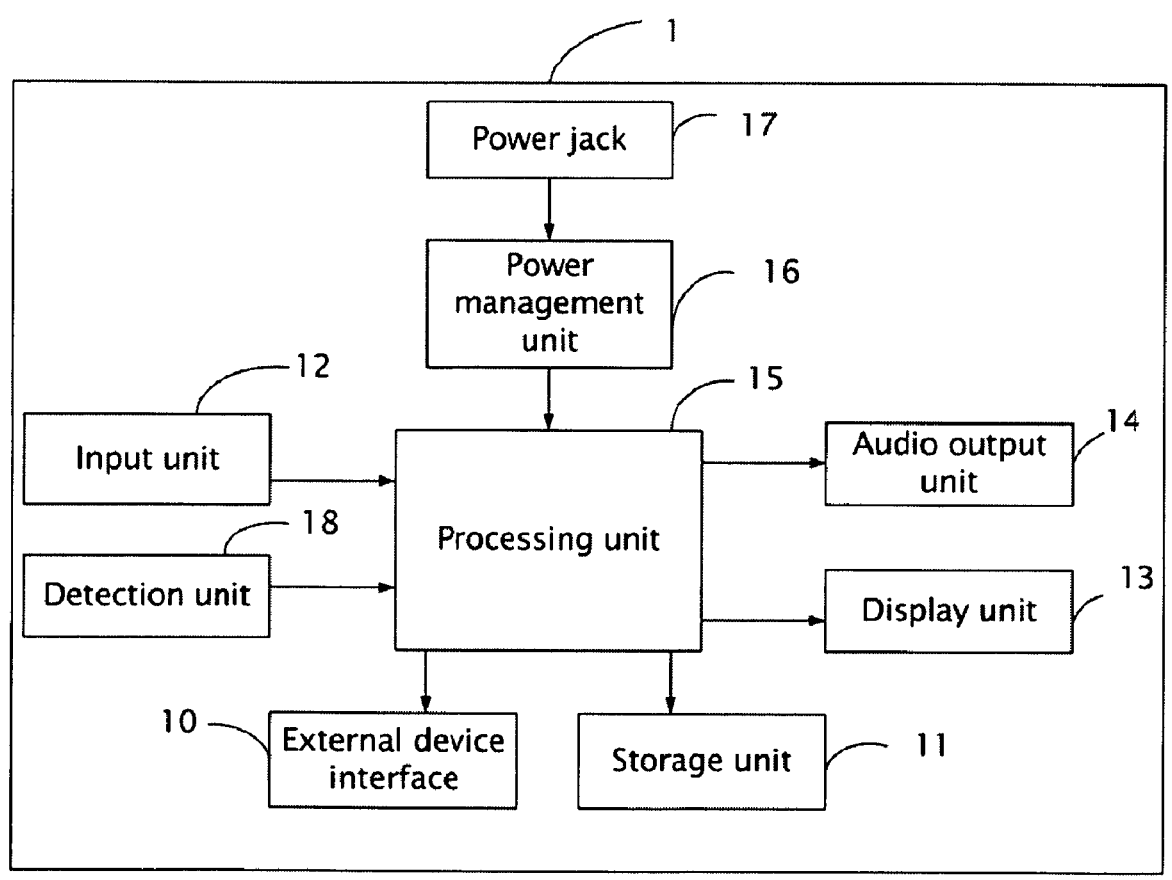

DIGITAL PHOTO FRAME WITH A FUNCTION OF AUTOMATICALLY POWER OFF

BACKGROUND

1. Technical Field

The disclosure relates to electronic devices and, particularly, to digital photo frames.

2. General Background

Nowadays, digital photos are getting more and more popular while digital cameras are becoming more and more affordable. Accordingly, in order to display the digital photos, digital photo frames are invented.

Like traditional photo frame, many digital photo frames can be either placed on a table or mounted on a wall. The biggest advantage of digital photo frames have over traditional photo frames is that the digital photo frames are capable of storing a large number of pictures and displaying the pictures in a slide show mode. So, people can enjoy a large number of pictures displayed by the digital photo frame.

However, the disadvantage of the digital photo frames is their high power consumption. More often than not, even through no people around the digital photo frame, the digital photo frame remains at work state, which leads to unnecessary power waste.

Therefore, it is necessary to provide an digital photo frame to overcomes the above-identified deficiencies.

SUMMARY

The present invention provides a digital photo frame with a function of powering off automatically.

The digital photo frame, includes: a power jack configured for connecting to a power source; a power management unit, a storage unit, a display unit, a detection unit, and a processing unit.

The power management unit is configured for distributing power from the power source to the digital photo frame. The storage unit is configured for storing a plurality of digital pictures. The display unit is configured for displaying the digital pictures. The detection unit is configured for detecting whether there is some one around the digital photo frame. The processing unit is configured for controlling the power management unit to stop providing power to the display unit if the detection unit detects nobody around the digital photo frame in a first predetermined time period, and controlling the power management unit to stop providing power to the digital photo frame if the detection unit detects nobody around the digital photo frame in a second predetermined time period.

BRIEF DESCRIPTION OF THE DRAWINGS

The components in the drawings are not necessarily drawn to scale, the emphasis instead being placed upon clearly illustrating the principles of the digital photo frame. Moreover, in the drawings, like reference numerals designate corresponding parts throughout the several views.

The FIGURE is a block diagram of a digital photo frame according to an exemplary embodiment.

DETAILED DESCRIPTION OF THE EMBODIMENTS

Referring to the FIGURE, the digital photo frame (DPF) 1 includes an external device interface 10, a storage unit 11, an input unit 12, a display unit 13, an audio output unit 14, a processing unit 15, a power management unit 16, a power jack 17, and a detection unit 18.

The external device interface 10 is configured to connect with a external device (not shown). The external device can be a storage card (for example, a secure digital (SD) card, a compact flash (CF) card) or another electronic device (for example, a digital camera, a mobile phone or a computer).

The storage unit 11 is configured to store media files. The media files include, but is not limited to, audio files, digital pictures, videos, etc. In the exemplary embodiment, the storage unit 11 is a built-in storage unit, such as a flash memory, a micro drive, and so on. The input unit 12 is configured to generate signals in response to user's operations. The input unit 12 can be an input key (button), a knob, and the like. The display unit 13 is configured to display the media files. The audio output unit 14 is configured to output audio signals.

The power jack 17 is configured to connect to a power source (not shown). The power source can be a battery, an alternating current to direct current (AC/DC) adaptor, and the like. The power management module 16 is configured to distribute power from the power source to a plurality of functional units of the DPF 1, such as the display unit 13, the audio output unit 14, the processing unit 15 and the detection unit 18.

The detection unit 18 is configured to detect whether there is a person around the DPF 1 in a predetermined area. The detection unit 18 can be an infrared detection unit or a microwave detection unit. If the detection unit 18 detects that nobody is around the DPF 1 in a first predetermined time period, then the detection unit 18 produces a first detection signal and transmits the first detection signal to the processing unit 15. The processing unit 15 controls the power management unit 16 to stop providing power to the display unit 13 when receiving the first detection signal. The display unit 13 stops displaying the digital pictures, thereby reducing power consumption.

The processing unit 15 also controls a media player (not shown) to play an audio file when receiving the first detection signal. The media player produces audio signals and outputs the audio signals through the audio output unit 14 to prompt people whether to continue displaying the digital pictures.

If the detection unit 18 detects nobody around the DPF 1 in the first predetermined time period, the detection unit 18 further detects whether there is a person around the DPF 1 in a second predetermined time period. The detection unit 18 produces a second detection signal and outputs the second detection signal to the processing unit 15 when detecting a person around the DPF 1 in the second predetermined time period. The processing unit 15 controls the power management unit 16 to distribute power to the display unit 13 again when receiving the second detection signal, and the display unit 13 displays the digital pictures again. The processing unit 15 further controls the media player to stop playing the audio file when receiving the second detection signal.

If the detection unit 18 never detects anyone near the DPF 1 in the second predetermined time period, the detection unit 18 outputs a power-off signal to the processing unit 15. The processing unit 15 controls the power management unit 16 to stop providing power to the other functional units of the DPF 1 when receiving the power-off signal, and the DPF 1 is powered off to reduce the power consumption further.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the present invention.

What is claimed is:

1. A digital photo frame comprising:
   a power jack configured for connecting to a power source;
   a power management unit configured for distributing power from the power jack to the digital photo frame;
   a storage unit configured for storing a plurality of digital pictures;
   a display unit configured for displaying the digital pictures;
   a detection unit configured for detecting whether there is a person around the digital photo frame;
   a processing unit connected with the detection unit and configured for controlling the power management unit to stop providing power to the display unit and controlling a media player to play the audio file if the detection unit detects nobody around the digital photo frame in a first predetermined time period, controlling the power management unit to stop providing power to the digital photo frame if the detection unit detects nobody around the digital photo frame in a second predetermined time period, and controlling the media player to stop playing the audio file if the detection unit detects a person around the digital photo frame in the second predetermined time period.

2. A method of automatic powering off a digital photo frame, wherein, the digital photo frame comprises:
   a processing unit;
   a power management unit;
   a detection unit; and
   a display unit;
   the method comprising the steps of:
   sending a first detection signal to the processing unit when the detection unit does not detects a person around the digital photo frame in a first predetermined time period;
   powering off the display unit via the power management unit controlled by the processing unit and outputting audio signals via an audio output unit controlled by the processing unit when the processing unit receives the first detection signal;
   sending a power-off signal to the processing unit when the detection unit does not detects a person around the digital photo frame in a second predetermined time period;
   powering off the digital photo frame via the power management unit controlled by the processing unit when the processing unit receives the power-off signal;
   sending a second detection signal to the processing unit when the detection unit detects a person around the digital photo frame in a second predetermined time period; and
   powering on the display unit via the power management unit controlled by the processing unit and stopping outputting the audio signals via the audio output unit controlled by the processing unit when the processing unit receives the second detection signal.

* * * * *